(12) United States Patent
Lutz et al.

(10) Patent No.: US 12,201,256 B2
(45) Date of Patent: Jan. 21, 2025

(54) WATER-USING DOMESTIC APPLIANCE AND METHOD FOR OPERATING A WATER-USING DOMESTIC APPLIANCE

(71) Applicant: BSH Hausgeräte GmbH, Munich (DE)

(72) Inventors: Stephan Lutz, Zusamaltheim (DE); Stefan Pollithy, Forheim (DE); Markus Wecker, Gundremmingen (DE); Jürgen Klein, Biberbach (DE)

(73) Assignee: BSH Hausgeräte GmbH, Munich (DE)

( * ) Notice: Subject to any disclaimer, the term of this patent is extended or adjusted under 35 U.S.C. 154(b) by 456 days.

(21) Appl. No.: 17/778,425

(22) PCT Filed: Nov. 17, 2020

(86) PCT No.: PCT/EP2020/082380
§ 371 (c)(1),
(2) Date: May 20, 2022

(87) PCT Pub. No.: WO2021/110408
PCT Pub. Date: Jun. 10, 2021

(65) Prior Publication Data
US 2022/0409006 A1    Dec. 29, 2022

(30) Foreign Application Priority Data
Dec. 5, 2019  (DE) .......................... 102019219014.6

(51) Int. Cl.
*A47L 15/46* (2006.01)
*A47L 15/42* (2006.01)
*F16K 31/02* (2006.01)

(52) U.S. Cl.
CPC ........... *A47L 15/46* (2013.01); *A47L 15/4225* (2013.01); *A47L 15/4259* (2013.01); *F16K 31/02* (2013.01); *A47L 2501/05* (2013.01); *A47L 2501/22* (2013.01)

(58) Field of Classification Search
CPC ...................................................... A47L 15/46
See application file for complete search history.

(56) References Cited

U.S. PATENT DOCUMENTS

| 7,499,254 | B2 | 3/2009 | Joens |
| 9,649,009 | B2 | 5/2017 | Grimminger |

FOREIGN PATENT DOCUMENTS

| EP | 0091648 A1 | 10/1983 |
| EP | 1988207 A2 | 11/2008 |
| EP | 2105527 A1 | 9/2009 |

OTHER PUBLICATIONS

National Search Report DE 102019219014.6 dated Nov. 3, 2020.
International Search Report PCT/EP2020/082380 dated Dec. 3, 2020.

*Primary Examiner* — Jason Y Ko
(74) *Attorney, Agent, or Firm* — Michael E. Tschupp; Andre Pallapies; Brandon G. Braun

(57) ABSTRACT

A water-using household appliance includes an electrically controllable actuator, a first voltage source designed to provide a switch-on power amount to the actuator, a second voltage source designed to provide a holding power amount to the actuator, and a control unit designed to electrically connect the first voltage source to the actuator in order to switch on the actuator and, after a switch-on interval, to electrically disconnect the first voltage source from the actuator and to electrically connect the second voltage source to the actuator.

19 Claims, 4 Drawing Sheets

WATER-USING DOMESTIC APPLIANCE AND METHOD FOR OPERATING A WATER-USING DOMESTIC APPLIANCE

CROSS-REFERENCES TO RELATED APPLICATIONS

This application is the U.S. National Stage of International Application No. PCT/EP2020/082380, filed Nov. 17, 2020, which designated the United States and has been published as International Publication No. WO 2021/110408 A1 and which claims the priority of German Patent Application, Serial No. 10 2019 219 014.6, filed Dec. 5, 2019, pursuant to 35 U.S.C. 119 (a)-(d).

The contents of International Application No. PCT/EP2020/082380 and German Patent Application, Serial No. 10 2019 219 014.6 are incorporated herein by reference in their entireties as if fully set forth herein.

BACKGROUND OF THE INVENTION

The present invention relates to a water-using household appliance and a method for operating a water-using household appliance.

Various electrical consumers are used in known water-using household appliances. These consumers may be operated directly by a mains voltage or by means of a voltage source which provides a specific voltage. Such electrical consumers have a certain risk of breakdown. In the case of a breakdown of such a consumer, for example due to a defect, it has to be ensured that this may not lead to further problems, such as for example the combustion of a plastics component. To this end, specific safety measures are provided, such as for example a generous design of the electrical circuits, electrical protective circuits and the use of correspondingly robust materials.

EP 1 594 227 A2 discloses an electrical circuit for switching a solenoid valve, wherein the solenoid valve is activated for switching on a voltage which is reduced after the elapse of a time interval. EP 0 091 648 A1 discloses a further electrical circuit by which a solenoid valve may be operated at two voltage levels.

BRIEF SUMMARY OF THE INVENTION

Against this background, an object of the present invention is to provide an improved water-using household appliance.

According to a first aspect, a water-using household appliance, in particular a dishwasher, comprising at least an electrically controllable actuator is proposed. The water-using household appliance comprises a first voltage source for providing a switch-on power amount to the actuator and a second voltage source for providing at least a holding power amount to the actuator. A control unit is designed to electrically connect the first voltage source to the actuator in order to switch on the actuator and, after a switch-on interval, to electrically disconnect the first voltage source from the actuator and to electrically connect the second voltage source to the actuator.

This water-using household appliance has several advantages. By using two voltage sources, these voltage sources may be designed in each case with a lower power level so that they may be constructed in a simpler manner, require less material and less installation space and have a higher level of operational safety. It is also possible to save energy since, after being switched on, the actuator may be operated in the holding phase at a lower power, in particular at a lower voltage than in the switch-on phase. Moreover, the voltage sources may be optimized more accurately to a predetermined load so that they are able to achieve a higher level of efficiency. Additionally, a switch-on period of the actuator may be shortened if the actuator is subjected to a higher switch-on voltage, for example, since it then responds more rapidly. Moreover, after it has been electrically disconnected from the actuator, the first voltage source may be used for switching on further actuators without it being already preloaded with the operation of an actuator.

The actuator may be a DC consumer or even an AC consumer, wherein the voltage source is correspondingly designed as a function thereof for the output of a DC voltage signal or an AC voltage signal. The actuator comprises, for example, an electric motor, a solenoid valve, a thermal actuator or the like.

The actuator has a switched-on state and a switched-off state. In the switched-off state the actuator is inactive, i.e. it is in a resting position. In the case of a valve, for example, the resting position may be open or closed. In the switched-off state, in particular, the actuator does not consume any electrical energy.

In order to switch on the actuator, i.e. to move it from the switched-off state to the switched-on state, the actuator requires a switch-on power amount. The switch-on power amount, in particular, is a higher power than the holding power amount, which is a power required to keep the actuator in the switched-on state. This may be because, for example, electrical energy is required to switch on the actuator in order to create a magnetic field, to set a rotor into a rotational movement or even to bring a heating element of a thermal actuator up to a specific temperature.

The first and the second voltage source are designed to output a voltage signal. A voltage signal may be characterized, in particular, by a specific voltage, a specific current and a specific frequency. Moreover, a waveform, for example a sinusoidal signal, a square-wave signal, a sawtooth signal or the like, may be specific to a voltage signal. In this regard, the voltage source may comprise a function generator. The voltage signal is preferably specifically designed for the actuator, so that the voltage signal provides the required switch-on power amount or the required holding power amount which is specifically adapted to the actuator.

Preferably, the voltage sources are designed in such a manner that they output a specific constant voltage. In particular, in the case of actuators which behave in the manner of an ohmic resistor, the constant voltage leads to a specific power. With a constant electrical resistance of the actuator, the power is also constant.

The first and the second voltage source are designed for connection to a power grid, for example a public power grid. The public power grid may be configured differently, in particular relative to a voltage and/or frequency. The respective voltage source is preferably designed to output the voltage signal irrespective of the specification of the connected power grid. Thus an operation of the water-using household appliance is possible in different regions of the world without adaptations to the voltage sources having to be undertaken.

The actuator is switched on by the actuator being electrically connected to the first voltage source which provides the switch-on power amount. As a function of the type of actuator and, for example, a voltage of the output voltage signal, the actuator requires a certain time in order to reach a stable switched-on state. This time is denoted in the present case as the switch-on interval. The switch-on interval may have values, for example, of between a few μs, to several seconds. The switch-on interval for the actuator may be fixed by a predetermined time. For example, a switch-on interval of three seconds may be predetermined for an electric motor. However, it may also be provided that a sensor detects a position or an operating state of the actuator and as a function thereof the control unit determines when the actuator has reached the stable switched-on state, so that it is possible to switch over between the voltage sources. For example, in the case of an electric motor it may be provided that this electric motor has reached a certain speed and keeps this speed constant for at least half a second.

If the switched-on state is reached, i.e. the actuator has reached a stable operating state, it is sufficient to provide the holding power amount to the actuator in order to keep the actuator switched on. The holding power amount is, for example, a power loss which the actuator consumes in the switched-on state. To provide the holding power amount, the second voltage source is electrically connected to the actuator.

If the second voltage source is electrically disconnected from the actuator, then the actuator transfers into the switched-off state.

The control unit may be configured as a separate electrical circuit or even as a constituent part of a control device controlling the water-using household appliance.

The control unit may be implemented as hardware technology and/or software technology. In the case of an implementation as hardware technology, the control unit may be configured, for example, as a computer or as a microprocessor. In the case of an implementation as software technology, the control unit may be configured as computer program product, as a function, as a routine, as part of a program code or as an executable object.

According to one embodiment of the water-using household appliance, a switch-on power amount consumed by the actuator is greater than 50% of a maximum output power of the first voltage source.

If the first voltage source has a relatively low maximum output power, in particular with low power reserves regarding a permanent load or peak load to be anticipated, the voltage source may also be constructed in a relatively simple manner and thus produced cost-effectively. A voltage source of correspondingly simple construction, in particular, is not able to provide the switch-on power amount for two such actuators simultaneously. In the present case, however, it is possible to switch on a plurality of different actuators with just one voltage source if these actuators are switched on one after the other.

The maximum output power of the voltage source may preferably be provided thereby for the duration of the switch-on interval. The maximum output power, however, may also be a continuous output of the voltage source.

According to a further embodiment of the water-using household appliance, said water-using household appliance comprises a plurality of electrically controllable actuators. The first voltage source is designed to provide the switch-on power amount for each individual actuator of the plurality thereof, and the second voltage source is designed to provide simultaneously the holding power amount for at least two actuators of the plurality thereof. The control unit is also designed to switch on at least two actuators of the plurality thereof in order to connect the first voltage source electrically to a first actuator of the plurality thereof, and after the switch-on interval of the first actuator to disconnect the first voltage source electrically from the first actuator and to connect the second voltage source electrically to the first actuator, and to connect the first voltage source electrically to a further actuator of the plurality thereof, and after the switch-on interval of the further actuator to disconnect the first voltage source electrically from the further actuator and to connect the second voltage source electrically to the further actuator.

This embodiment has the advantage that a plurality of actuators may be operated with only two voltage sources, which may be designed in each case to be relatively small or weak. To this end, the actuators are switched on in sequence, i.e. chronologically one after the other. The plurality of actuators may comprise different actuators which may have different switch-on power amounts and/or holding power amounts and/or switch-on intervals. The first voltage source is set up, in particular, such that it is designed to provide the highest switch-on power amount of one of the actuators of the plurality thereof. The second voltage source is set up such that it is designed to provide simultaneously the holding power amount of at least two actuators of the plurality thereof.

According to a further embodiment of the water-using household appliance, this water-using household appliance has a plurality of second voltage sources, wherein one respective second voltage source of the plurality thereof is assigned to at least one actuator and is designed to provide the holding power amount for the at least one assigned actuator.

This embodiment is advantageous since it is possible to design each of the second voltage sources for a predetermined maximum power and/or for the output of a predetermined voltage signal as a function of the assigned actuator or the assigned actuators. Thus it is possible, for example, to fulfill requirements relative to operational safety in a simple manner and at the same time to design the voltage sources optimally such that these voltage sources have very high level of efficiency, whereby an energy consumption of the water-using household appliance is optimized.

According to a further embodiment of the water-using household appliance, the first voltage source and/or the second voltage source in each case have a maximum output power of 15 W.

This embodiment has the advantage that power circuits whose maximum power does not exceed 15 W are considered to be low-power circuits, for example according to DIN EN 60335-1, for which the requirements relative to operational safety are lower than for such circuits which have a higher power than 15 W. This is advantageous relative to the selection of the materials of the components, such as for example for a housing or insulators, since in the case of low-power circuits these components are subject to lower fire protection requirements. This permits a wide selection of different materials which are more cost-effective, which may be processed more easily, which have improved mechanical properties and which contain fewer toxic substances than such materials which have to fulfill high fire protection requirements. Overall, therefore, in this embodiment it is possible to save resources and costs and at the same time to protect the environment.

According to a further embodiment of the water-using household appliance, the first voltage source has a constant output voltage of up to 48 V, preferably up to 24 V, further preferably up to 12 V, and the second voltage source has a constant output voltage of up to 48 V, preferably up to 24 V, further preferably up to 12 V.

This embodiment has the advantage that, with a low output voltage, there are fewer requirements relative to an insulation of the lines carrying the voltage signal and the actuators and/or power circuits connected thereto. Thus resources and costs may be saved in such a design.

A constant output voltage is to be understood to mean not only DC voltage signals but an AC voltage is also encompassed thereby, with an effective value of the specified voltage value.

The voltage sources have, in particular, a specific electrical circuit exclusively configured for the output of the constant output voltage. The output voltage signal, in particular, is not a pulse-width-modulated voltage signal but a voltage signal with a specific, permanently set characteristic. In this case, one respective voltage source may have circuits for the output of different voltage signals, for example a circuit for the output of a 24 V voltage signal and a further circuit for the output of a 12 V voltage signal.

Since the voltage sources do not output pulse-width-modulated voltage signals, it is possible to avoid the problems associated therewith, such as for example high-frequency noise interference, so-called beeping, or an emission of electromagnetic interference radiation, by a corresponding switching circuit.

According to a further embodiment of the water-using household appliance, the first voltage source has an output voltage which is higher, in particular at least twice as high, as the second voltage source.

This embodiment makes it particularly simple to operate the actuator in the holding phase at a reduced power.

According to a further embodiment of the water-using household appliance, a holding voltage of the actuator is at most 70%, preferably at most 50%, further preferably at most 35%, further preferably at most 25%, of a switch-on voltage of the actuator.

The switch-on voltage is the voltage used or required for switching on the actuator. The holding voltage is the voltage used or required to keep the actuator in the switched-on state.

In the case of a plurality of actuators, the ratio of switch-on voltage to holding voltage may be different for each actuator.

According to a further embodiment of the water-using household appliance, the holding power amount of the actuator is at most 70%, preferably at most 50%, further preferably at most 35%, further preferably at most 25%, of the switch-on power amount of the actuator.

In the case of a plurality of actuators, the ratio of the switch-on power amount to the holding power amount may be different for each actuator.

According to a further embodiment of the water-using household appliance, the control unit is designed to switch over from the first voltage source to the second voltage source for the actuator within a switchover time which is shorter than a switch-off time of the actuator.

If the actuator is disconnected from a voltage source, it is transferred to the switched-off state. This transfer does not take place instantly but lasts a certain length of time since, for example, during operation a rotor of an electric motor has a certain rotational energy which is dissipated when switched off. This may also be referred to as an inertia of the actuator. In order to prevent the actuator from being transferred to the switched-off state, the holding power amount is provided to the actuator within the switchover time, which is ensured in this embodiment. Thus the operation of the actuator is guaranteed.

In the case of a plurality of actuators, the switchover times may be different.

According to a further embodiment of the water-using household appliance, the control unit is designed to switch over from the first voltage source to the second voltage source such that during a switchover interval the first voltage source and the second voltage source are connected simultaneously to the actuator.

In this embodiment the actuator is prevented from being transferred into the switched-off state during the switchover. In particular in the case of very rapidly responding actuators, which have a low inertia, this may contribute to ensuring the operation thereof.

The control unit may use different switchover intervals for different actuators.

According to a further embodiment of the water-using household appliance, a diode is arranged in an electrical connection between the second voltage source and the actuator such that a current flow from the first voltage source to the second voltage source is prevented.

This embodiment is expedient if the first voltage source provides a higher voltage to the actuator for the switch-on than that provided by the second voltage source in order to keep the actuator switched on.

According to a further embodiment of the water-using household appliance, the actuator comprises an electromagnetic actuator, in particular a solenoid valve or an electric motor, and/or a thermoelectric actuator, in particular a bimetal actuator, a phase transition actuator, a shape memory alloy, a PTC thermistor and/or a heating element.

According to a further aspect, a method for operating a water-using household appliance, in particular a dishwasher, comprising at least an electrically controllable actuator is proposed. In a first step, the actuator is electrically connected to a first voltage source for providing a switch-on power amount in order to switch on the actuator. In a second step, the first voltage source is disconnected from the actuator after the elapse of a switch-on interval. In a third step, the actuator is electrically connected to a second voltage source for providing a holding power amount.

This method is preferably carried out by a water-using household appliance according to the first aspect.

The specified sequence of steps is not mandatory, in particular the second voltage source may be already electrically connected to the actuator before the first voltage source is electrically disconnected from the actuator. This results in a switchover interval during which the two voltage sources are electrically connected to the actuator.

Moreover, after the connection of the actuator to the first voltage source, the switch-on power amount consumed by the actuator is measured by means of a power measuring device and compared with a setpoint value for the actuator stored in a controller. The actuator is only connected to the second voltage source when the switch-on power amount consumed by the actuator does not exceed the setpoint value.

This embodiment provides the advantage that for fulfilling the requirements of a low-power circuit, it is sufficient to design only the first voltage source as a low power voltage source, since a switchover of a defective actuator to the second voltage source is prevented.

According to a further embodiment of the method, this method further comprises: connecting the first voltage source to a further actuator after the first voltage source has been disconnected from the actuator, in order to switch on the further actuator; disconnecting the first voltage source from the further actuator after the elapse of a switch-on interval; and connecting the further actuator to the second voltage source in order to keep the further actuator switched on.

In this embodiment, a plurality of actuators are switched on in sequence one after the other. The first voltage source is thus always loaded with only one actuator at a time, which is why a maximum power of the first voltage source may be selected corresponding to a maximum switch-on power amount required. The second voltage source, however, supplies at least two actuators at the same time with the holding power amount. Since the holding power amount of the actuators is relatively low, the second voltage source may supply a plurality of actuators simultaneously with the respective holding power amount thereof. The switch-on interval refers in this case to the respective actuator, which may be different for different actuators.

A computer program product, which brings about the execution of the method as described above on a program-controlled device, is also proposed.

A computer program product, such as for example a computer program means, may be provided or delivered for example as a storage medium, such as for example memory card, USB stick, CD ROM, DVD, or even in the form of downloadable file from a server in a network. This may be implemented, for example, in a wireless communication network by the transfer of a corresponding file to the computer program product or the computer program means.

The embodiments and features described for the proposed water-using household appliance correspondingly apply to the proposed method.

Further possible implementations of the invention also comprise not explicitly mentioned combinations of features or embodiments described above or below relative to the exemplary embodiments. In this case, the person skilled in the art will add individual aspects as improvements or additions to the respective basic form of the invention.

BRIEF DESCRIPTION OF THE DRAWINGS

Further advantageous embodiments and aspects of the invention form the subject matter of the subclaims and the exemplary embodiments of the invention described hereinafter. The invention is also described in more detail using preferred embodiments, with reference to the accompanying figures.

DETAILED DESCRIPTION OF EXEMPLARY EMBODIMENTS OF THE PRESENT INVENTION

Figure 1:
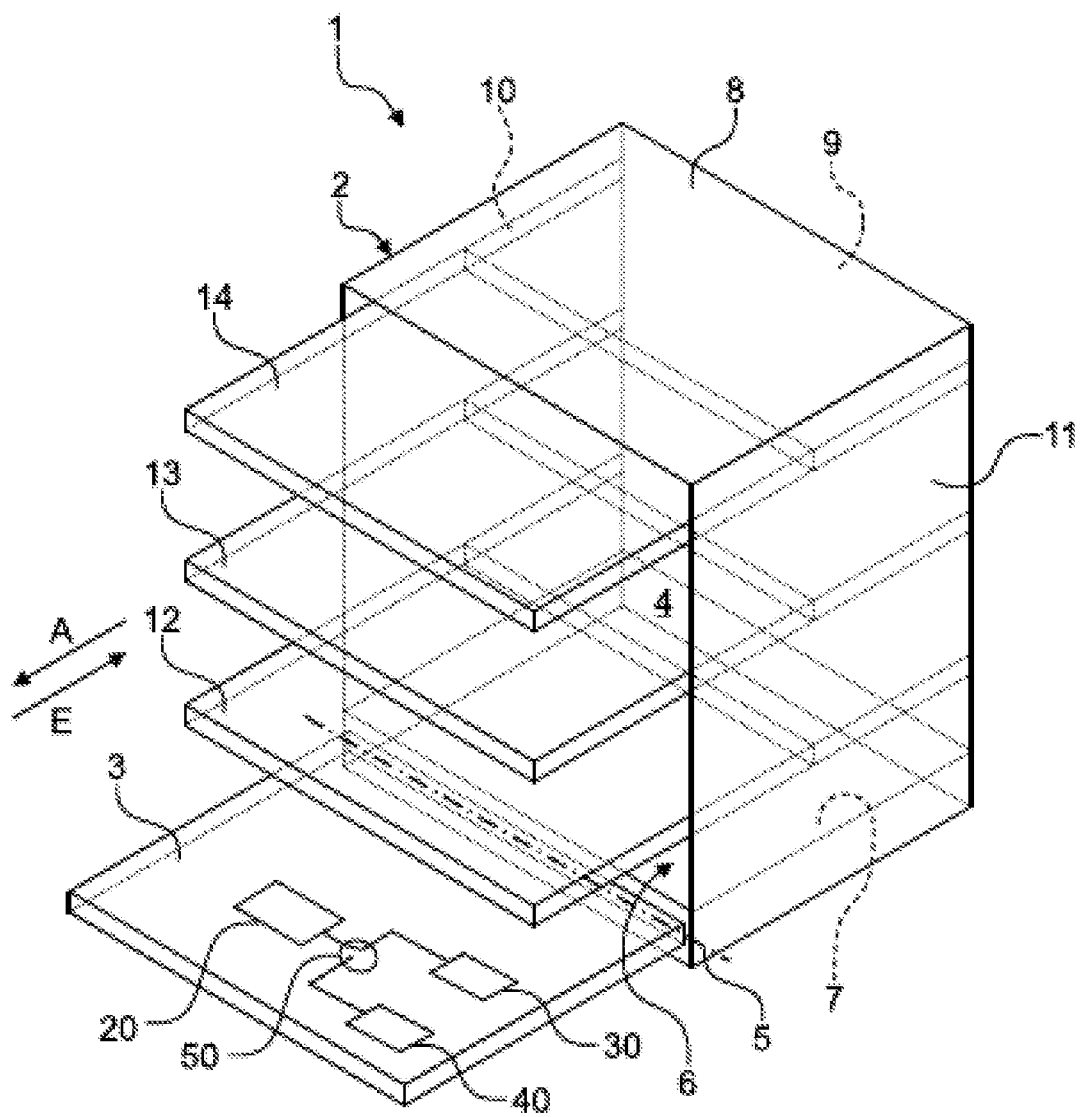
FIG. 1 shows a schematic perspective view of an exemplary embodiment of a water-using household appliance.

Elements which are the same or functionally the same are provided in the figures with the same reference characters unless indicated otherwise.

FIG. 1 shows a schematic perspective view of an embodiment of a water-using household appliance 1 which is configured in this case as a household dishwasher. The household dishwasher 1 comprises a washing container 2 which is able to be closed by a door 3, in particular in a water-tight manner. To this end, a sealing device may be provided between the door 3 and the washing container 2. The washing container 2 is preferably cuboidal. The washing container 2 may be arranged in a housing of the household dishwasher 1. The washing container 2 and the door 3 may form a washing chamber 4 for washing the items to be washed.

The door 3 is shown in FIG. 1 in the open position thereof. The door 3 may be closed or opened by pivoting about a pivot axis 5 provided at a lower end of the door 3. A loading opening 6 of the washing container 2 may be closed or opened by means of the door 3. The washing container 2 has a bottom 7, a ceiling 8 arranged opposite the bottom 7, a rear wall 9 arranged opposite the closed door 3, and two side walls 10, 11 arranged opposite one another. The bottom 7, the ceiling 8, the rear wall 9 and the side walls 10, 11 may be produced, for example, from a stainless steel sheet. Alternatively, for example, the bottom 7 may be produced from a plastics material.

The household dishwasher 1 also has at least one receptacle for items to be washed 12 to 14. Preferably, a plurality of receptacles for items to be washed 12 to 14, for example three thereof, may be provided, wherein the receptacle for items to be washed 12 has a lower receptacle for items to be washed or a bottom basket, the receptacle for items to be washed 13 has an upper receptacle for items to be washed or a top basket and the receptacle for items to be washed 14 has a cutlery tray. As FIG. 1 also shows, the receptacles for items to be washed 12 to 14 are arranged one above the other in the washing container 2. Each receptacle for items to be washed 12 to 14 is selectively displaceable into the washing container 2 or out of said washing container. In particular, each receptacle for items to be washed 12 to 14 is able to be pushed or retracted into the washing container 2 in a push-in direction E and is able to be pulled or extended out of the washing container 2 counter to the push-in direction E in a pull-out direction A.

The household dishwasher 1 also has on the door 3 an electrically controllable actuator 20 which is configured, for example, in this case as an electric motor for an electrical automatic door closing system. The electric motor 20 is designed for operation at 12 V DC voltage. A first voltage source 30 and a second voltage source 40 are provided. The first voltage source 30 and the second voltage source 40 are configured such that the maximum output power thereof is under 15 W. The first voltage source 30 in this case has an output voltage of 24 V DC voltage, the second voltage source 40 has an output voltage of 12 V DC voltage. The voltage sources 30, 40 are connected to a public power grid, not shown, which provides for example a 230 V AC voltage at 50 Hz.

A control unit 50 switches the voltage sources 30, 40 to the electric motor 20. For switching on the electric motor 20, for example in order to bring about a closing of the door 3, the control unit 50 initially switches the first voltage source 30 to the electric motor 20. This provides a switch-on power amount PE which is provided in this case at a voltage of 24 V. With the higher voltage of 24 V the electric motor 20 responds rapidly and has a high starting torque. Thus the electric motor 20 rapidly reaches a stable operating state. As soon as the electric motor 20 is in the stable operating state, for example when it has reached a specific speed, the control unit 50 switches over from the first voltage source 30 to the second voltage source 40. This switchover takes place in a time period during which the electric motor 20 still continues to rotate due to its inertia, for example, although electrical power is no longer supplied to the electric motor. After the switchover, the second voltage source 40 is connected to the electric motor 20 and provides a holding power amount PH thereto, which is provided in the present case at a voltage of 12 V. At 12 V the electric motor 20 consumes less electrical energy and still remains in a stable operating state. When the door 3 is closed, the control unit 50 disconnects the second voltage source 40 from the electric motor 20, whereby this electric motor is switched off.

Figure 2:
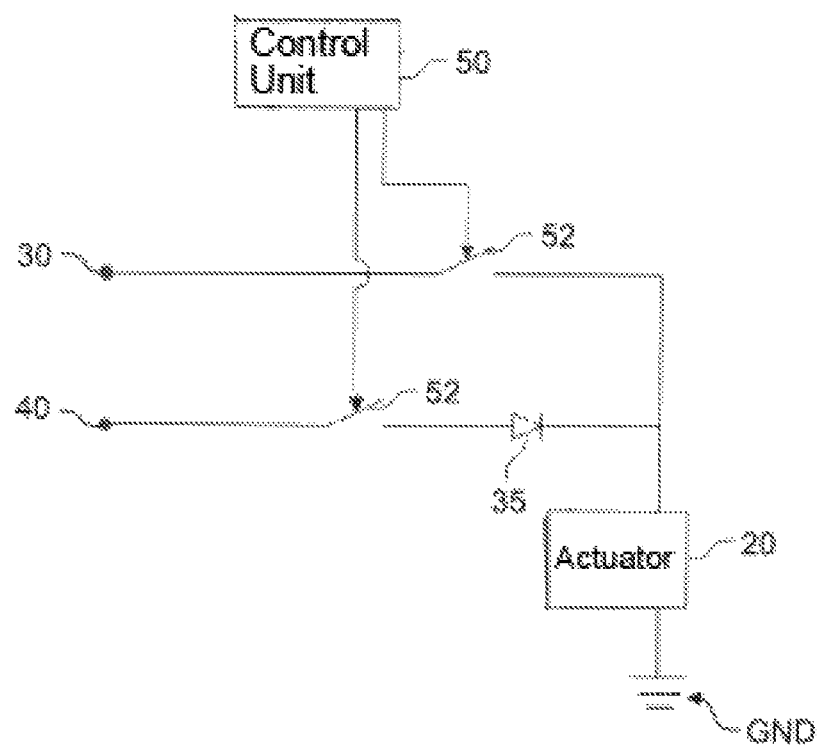
FIG. 2 shows a schematic block diagram of an exemplary embodiment of an electrical circuit.

FIG. 2 shows a schematic block diagram of an exemplary embodiment of an electrical circuit, according to which the voltage sources 30, 40 are connected, for example, to the electric motor 20 of the automatic door closing system according to FIG. 1. The voltage sources 30, 40 may be connected in each case to the actuator 20 by means of a switch 52 which is controlled by the control unit 50. As a particularity, a diode 35 is arranged in the connection of the second voltage source 40 to the actuator 20. When both switches 52 are closed at one point in time, this diode 35 prevents a current from flowing from the first voltage source 30 into the second voltage source 40. This may occur, in particular, when the first voltage source 30 provides a higher voltage than the second voltage source 40. Different variants of a switchover by the control unit 50 are shown in the following figures FIGS. 3A and 3B.

Figure 3A:
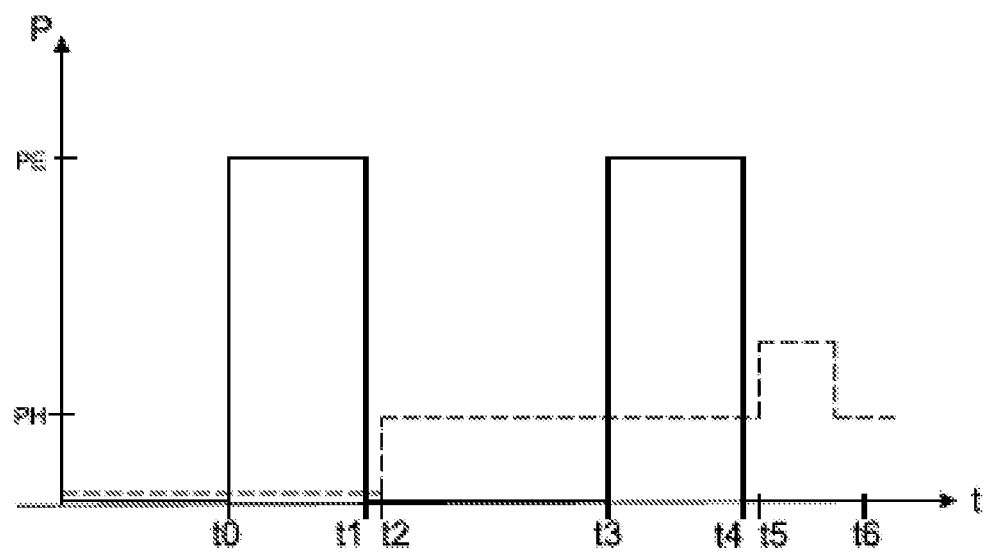
FIG. 3A shows an exemplary diagram of a power output of the first and second voltage source.

FIG. 3A shows an exemplary diagram of a power output of the first and second voltage source 30, 40 (see FIG. 1 or 2). In this example, two actuators 20 (see FIG. 1 or 2) are switched on one after the other and operated at the same time for a specific time interval. For example, the actuators 20 are a circulating pump and a drain pump of a household dishwasher. The diagram shows on the horizontal axis t a time coordinate and on the vertical axis P a power which is output in each case from the first voltage source 30 (solid line) and the second voltage source 40 (dashed line).

Initially the two pumps are switched off, which is why the two voltage sources 30, 40 do not output any power. At a time t0 the circulating pump is initially switched on. Thus the first voltage source 30 provides the switch-on power amount PE to the circulating pump. This switch-on power amount is provided, for example, at 48 V. After the elapse of a switch-on interval, at the time t1, the circulating pump is in a stable operating state. Now the first voltage source 30 is disconnected from the pump which is why the power drops back to 0. After a brief moment, at the time t2, the second voltage source 40 is connected to the pump and henceforth provides the holding power amount PH. The second voltage source outputs a 12 V voltage signal. The holding power amount PH is only approximately 25% of the switch-on power amount PE, which is why an energy-saving continuous operation of the circulating pump is possible.

At a later time t3, the lye pump is switched on by the first voltage source 30 being connected thereto. After the lye pump has reached a stable operating state at a time t4, initially the first voltage source 30 is disconnected from the lye pump and immediately afterwards, at the time t5, the second voltage source 40 is connected to the lye pump. Now the second voltage source 40 supplies both the circulating pump and the lye pump with electrical power. The output power corresponds to approximately twice the holding power amount PH. At a time t6 the circulating pump is switched off, i.e. the second voltage source 40 is disconnected from the circulating pump, which is why the output power drops again to a holding power amount PH. It should be mentioned that different actuators 20 may have different switch-on power amounts PE and/or holding power amounts PH, even if this is not shown here.

Figure 3B:
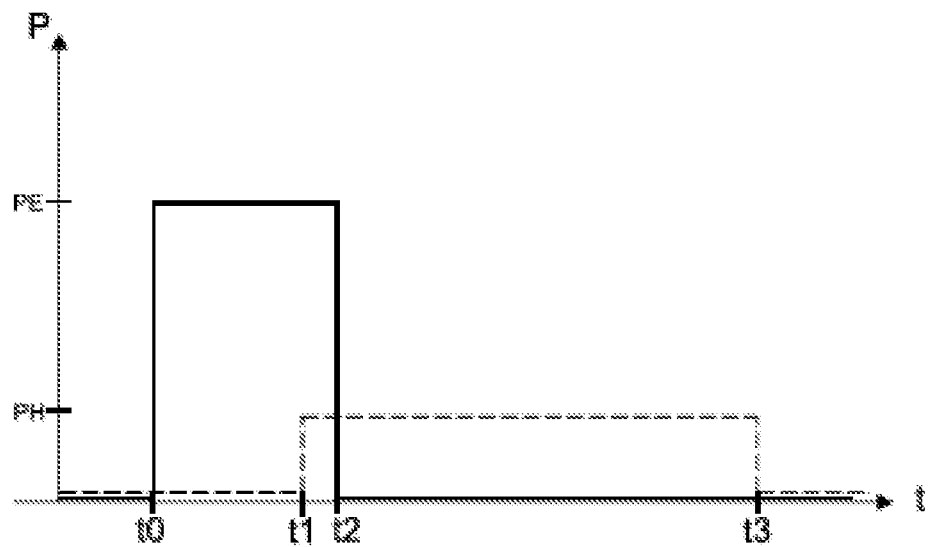
FIG. 3B shows a further exemplary diagram of a power output of the first and second voltage source.

FIG. 3B shows a further exemplary diagram of a power output of the first and second voltage source 30, 40. In FIG. 3B only one switch-on process is shown with the subsequent switchover. The difference from the two switch-on processes shown in FIG. 3A with the subsequent switchover is that here the second voltage source 40 is already connected at the time t1 to the actuator 20, whilst the first voltage source 30 is still connected to the actuator 20. The first voltage source 30 is only disconnected from the actuator 20 at a time t2. In the time interval dt=(t2−t1) both voltage sources 30, 40 are thus connected to the actuator 20. This is expedient, in particular in the case of actuators 20 which may react very sensitively to voltage fluctuations, in order to ensure that these actuators are not transferred into the switched-off state during the switchover.

FIGS. 3A and 3B show diagrams which refer to the power of the voltage sources 30, 40. It should be mentioned that if the connected actuator 20 has an ohmic behavior, the curves shown may be achieved by a corresponding output voltage.

Figure 4:
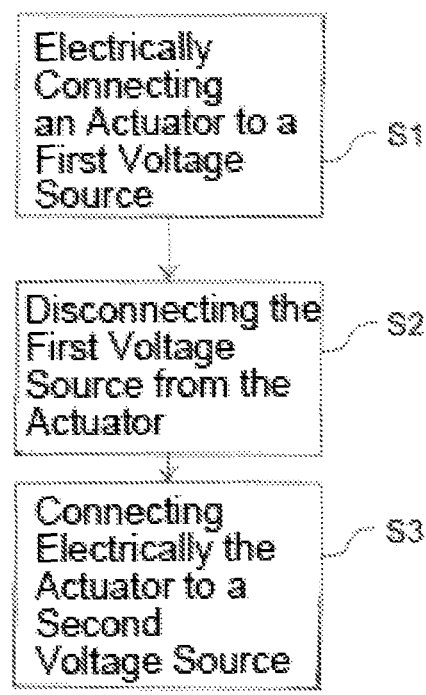
FIG. 4 shows a schematic block diagram of a method for operating a water-using household appliance.

FIG. 4 shows a schematic block diagram of an exemplary method for operating a water-using household appliance 1, for example the household dishwasher of FIG. 1. In a first step S1 an actuator 20 (see FIG. 1 or 2) is electrically connected to a first voltage source 30 (see FIG. 1 or 2) for providing a switch-on power amount PE (see FIG. 3A or 3B) in order to switch on the actuator 20. In a second step S2 the first voltage source 20 is disconnected from the actuator 20 after the elapse of a switch-on interval. In a third step S3 the actuator 20 is connected electrically to a second voltage source 40 (see FIG. 1 or 2) for providing a holding power amount PH (see FIG. 3A or 3B).

In embodiments of the method, the third step S3 may take place before the second step S2. Moreover, this method may be repeated multiple times in order to switch on a plurality of actuators 20 one after the other and to operate said actuators by the second voltage source 40.

Although the present invention has been described using exemplary embodiments, it may be modified in many different ways.

The invention claimed is:

1. A water-using household appliance, in particular dishwasher, comprising:
   an electrically controllable actuator;
   a first voltage source designed to provide a switch-on power amount to the actuator;
   a second voltage source designed to provide a holding power amount to the actuator; and
   a control unit designed to electrically connect the first voltage source to the actuator in order to switch on the actuator and, after a switch-on interval, to electrically disconnect the first voltage source from the actuator and to electrically connect the second voltage source to the actuator.

2. The water-using household appliance of claim 1, wherein the actuator consumes a switch-on power amount which is greater than 50% of a maximum output power of the first voltage source.

3. The water-using household appliance of claim 1, further comprising a plurality of said electrically controllable actuator, said first voltage source being designed to provide the switch-on power amount for each individual actuator of the plurality of said electrically controllable actuator, and said second voltage source being designed to provide simultaneously the holding power amount for at least two actuators of the plurality of said electrically controllable actuator, wherein the control unit is designed to switch on at least two actuators of the plurality of said electrically controllable actuator in order to connect the first voltage source electrically to a first one of the at least two actuators, and after the switch-on interval of the first one of the at least two actuators to disconnect the first voltage source electrically from the first one of the at least two actuators and to connect the second voltage source electrically to the first one of the at least two actuators, and to connect the first voltage source electrically to a further one the at least two actuators of the plurality of said electrically controllable actuator, and after the switch-on interval of the further one the at least two actuators to disconnect the first voltage source electrically from the further one the at least two actuators and to connect the second voltage source electrically to the further one the at least two actuators.

4. The water-using household appliance of claim 1, further comprising a plurality of said second voltage source and a plurality of said electrically controllable actuator, with the second voltage sources of the plurality of plurality of said second voltage source being operably connected to the actuators of the plurality of said electrically controllable actuator in one-to-one correspondence and designed to provide the holding power amount for the actuators of the plurality of said electrically controllable actuator, respectively.

5. The water-using household appliance of claim 1, wherein at least one of the first voltage source and the second voltage source has a maximum output power of 15 W.

6. The water-using household appliance of claim 1, wherein the first voltage source has a constant output voltage of up to 48 V, preferably up to 24 V, further preferably up to 12 V, and wherein the second voltage source has a constant output voltage of up to 48 V, preferably up to 24 V, further preferably up to 12 V.

7. The water-using household appliance of claim 1, wherein the first voltage source has an output voltage which is higher, in particular at least twice as high, as the second voltage source.

8. The water-using household appliance of claim 1, wherein the first voltage source has an output voltage which is at least twice as high as the second voltage source.

9. The water-using household appliance of claim 1, wherein the actuator has a holding voltage which is at most 70%, preferably at most 50%, further preferably at most 35%, further preferably at most 25%, of a switch-on voltage of the actuator.

10. The water-using household appliance of claim 1, wherein the holding power amount provided by the second voltage source to the actuator is at most 70% of the switch-on power amount provided by the first voltage source to the actuator.

11. The water-using household appliance of claim 1, wherein the holding power amount provided by the second voltage source to the actuator is at most 50% of the switch-on power amount provided by the first voltage source to the actuator.

12. The water-using household appliance of claim 1, wherein the holding power amount provided by the second voltage source to the actuator is at most 35% of the switch-on power amount provided by the first voltage source to the actuator.

13. The water-using household appliance of claim 1, wherein the holding power amount provided by the second voltage source to the actuator is at most 25% of the switch-on power amount provided by the first voltage source to the actuator.

14. The water-using household appliance of claim 1, wherein the control unit is designed to switch over from the first voltage source to the second voltage source within a switchover time which is shorter than a switch-off time of the actuator.

15. The water-using household appliance of claim 1, wherein the control unit is designed to switch over from the first voltage source to the second voltage source such that during a switchover interval the first voltage source and the second voltage source are connected simultaneously to the actuator.

16. The water-using household appliance of claim 1, further comprising a diode arranged in an electrical connection between the second voltage source and the actuator such that a current flow from the first voltage source to the second voltage source is prevented.

17. The water-using household appliance of claim 1, wherein the actuator comprises an electromagnetic actuator and/or a thermoelectric actuator.

18. A method for operating a water-using household appliance, in particular a dishwasher, said method comprising:
connecting an electrically controllable actuator of the water-using household appliance to a first voltage source for providing a switch-on power amount in order to switch on the actuator;
disconnecting the first voltage source from the actuator after elapse of a switch-on interval; and
connecting the actuator to a second voltage source for providing a holding power amount in order to keep the actuator switched on.

19. The method of claim 18, further comprising:
connecting the first voltage source to a further actuator of the water-using household appliance after the first voltage source has been disconnected from the actuator, in order to switch on the further actuator;
disconnecting the first voltage source from the further actuator after elapse of a switch-on interval; and
connecting the further actuator to the second voltage source in order to keep the actuator switched on.

* * * * *